(12) United States Patent
Liu et al.

(10) Patent No.: US 7,552,148 B2
(45) Date of Patent: Jun. 23, 2009

(54) SHUTDOWN RECOVERY

(75) Inventors: Huisheng Liu, Sammamish, WA (US); Guhan Suriyanarayanan, Redmond, WA (US); Nikolaj S. Bjorner, Woodinville, WA (US); Dan Teodosiu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/363,828

(22) Filed: Feb. 28, 2006

(65) Prior Publication Data

US 2007/0220328 A1    Sep. 20, 2007

(51) Int. Cl.
G06F 12/00 (2006.01)
G06F 17/30 (2006.01)
G01R 31/28 (2006.01)

(52) U.S. Cl. ............................. 707/202; 714/19; 714/24
(58) Field of Classification Search ................. 707/202; 714/19, 24
See application file for complete search history.

(56) References Cited

U.S. PATENT DOCUMENTS

| | | | | |
|---|---|---|---|---|
| 6,021,508 | A * | 2/2000 | Schmuck et al. | 714/4 |
| 6,098,079 | A * | 8/2000 | Howard | 707/205 |
| 6,185,577 | B1 * | 2/2001 | Nainani et al. | 707/202 |
| 6,584,582 | B1 | 6/2003 | O'Connor | |
| 6,725,392 | B1 * | 4/2004 | Frey et al. | 714/6 |
| 6,728,854 | B2 | 4/2004 | Frank | |
| 6,938,070 | B2 * | 8/2005 | Esposito | 709/205 |
| 7,290,019 | B2 * | 10/2007 | Bjorner et al. | 707/206 |
| 7,467,330 | B2 * | 12/2008 | Kingsbury et al. | 714/19 |
| 7,472,138 | B2 * | 12/2008 | Adkins et al. | 707/202 |
| 2002/0147719 | A1 * | 10/2002 | Zhang et al. | 707/9 |
| 2003/0187859 | A1 | 10/2003 | Belov | |
| 2003/0217031 | A1 * | 11/2003 | Owen et al. | 707/1 |
| 2004/0078666 | A1 * | 4/2004 | Aasheim et al. | 714/24 |
| 2004/0186916 | A1 * | 9/2004 | Bjorner | 709/248 |
| 2005/0015413 | A1 * | 1/2005 | Teodosiu et al. | 707/201 |
| 2005/0149525 | A1 | 7/2005 | Verma | |
| 2005/0289414 | A1 * | 12/2005 | Adya et al. | 714/724 |
| 2006/0184728 | A1 * | 8/2006 | Yamagami | 711/111 |
| 2009/0019308 | A1 * | 1/2009 | Amano | 714/19 |

FOREIGN PATENT DOCUMENTS

EP    1387296 A1 *    2/2004

OTHER PUBLICATIONS

"Active Directory Replication", 2004, available online: http://web.archive.org/web/20041209164846/http://www.comptechdoc.org/os/windows/win2k/win2kadrepl.html.*

(Continued)

*Primary Examiner*—Mohammad Ali
*Assistant Examiner*—Brannon W Smith
(74) *Attorney, Agent, or Firm*—Workman Nydegger

(57) ABSTRACT

Aspects of the subject matter described herein relate to shutdown recovery for resource replication systems. In aspects, a mechanism is described in which a machine having replicated data thereon can recover from a dirty shutdown. First, the machine determines whether a dirty shutdown has occurred. If so, the machine automatically performs shutdown recovery by causing resource metadata stored by the machine to be consistent with resource data stored by the machine. This may involve fixing the resource metadata for updates to the resource data that were not flushed to disk or may involve deleting the resource metadata and restoring it from another machine replicating the data.

8 Claims, 7 Drawing Sheets

OTHER PUBLICATIONS

"Detailed Notes on the "Dirty Shutdown Flag" under MS-Windows™", Dec. 4, 2001, avaialbe online: http://mirror.href.com/thestarman/DOS/DirtyShutdownFlag.html.*

Stephen C. Tweedie, "Journaling the Linux ext2fs Filesystem", 1998, LinuxExpo '98.*

Sanjay Ghemawat et al, "The Google File System", 2003, ACM.*

Event Log based Dependability Analysis of Window NT and 2K Systems; http://ieeexplore.ieee.org/iel5/8447/26604/01185651.pdf?isNumber=.

Reimplementing the Cedar File System Using Logging and Group Commit; http://delivery.acm.org/10.1145/40000/37518/p155-hagmann.pdf?key1=37518&key2=2337483311&coll=GUIDE&dl=GUIDE&CFID-62246386&CFTOKEN=8761736.

PersonalRAID: Mobile Storage for Distributed and Disconnected Computers 1; http://www.usenix.org/events/fast02/full_papers/sobti/sobti_html.

* cited by examiner

SHUTDOWN RECOVERY

BACKGROUND

Systems for replicating resources are becoming increasingly important to ensure availability and fault tolerance in large networks. Corporate networks that replicate files containing domain credentials and policies are one example where availability, scalability, consistency, and reliability are helpful. Maintaining consistency and correctness during abnormal shutdowns, however, is problematic.

SUMMARY

Briefly, aspects of the subject matter described herein relate to shutdown recovery for resource replication systems. In aspects, a mechanism is described in which a machine having replicated data thereon can recover from a dirty shutdown. First, the machine determines whether a dirty shutdown has occurred. If so, the machine automatically performs shutdown recovery by causing resource metadata stored by the machine to be consistent with resource data stored by the machine. This may involve fixing the resource metadata for updates to the resource data that were not flushed to disk or may involve deleting the resource metadata and restoring it from another machine replicating the data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
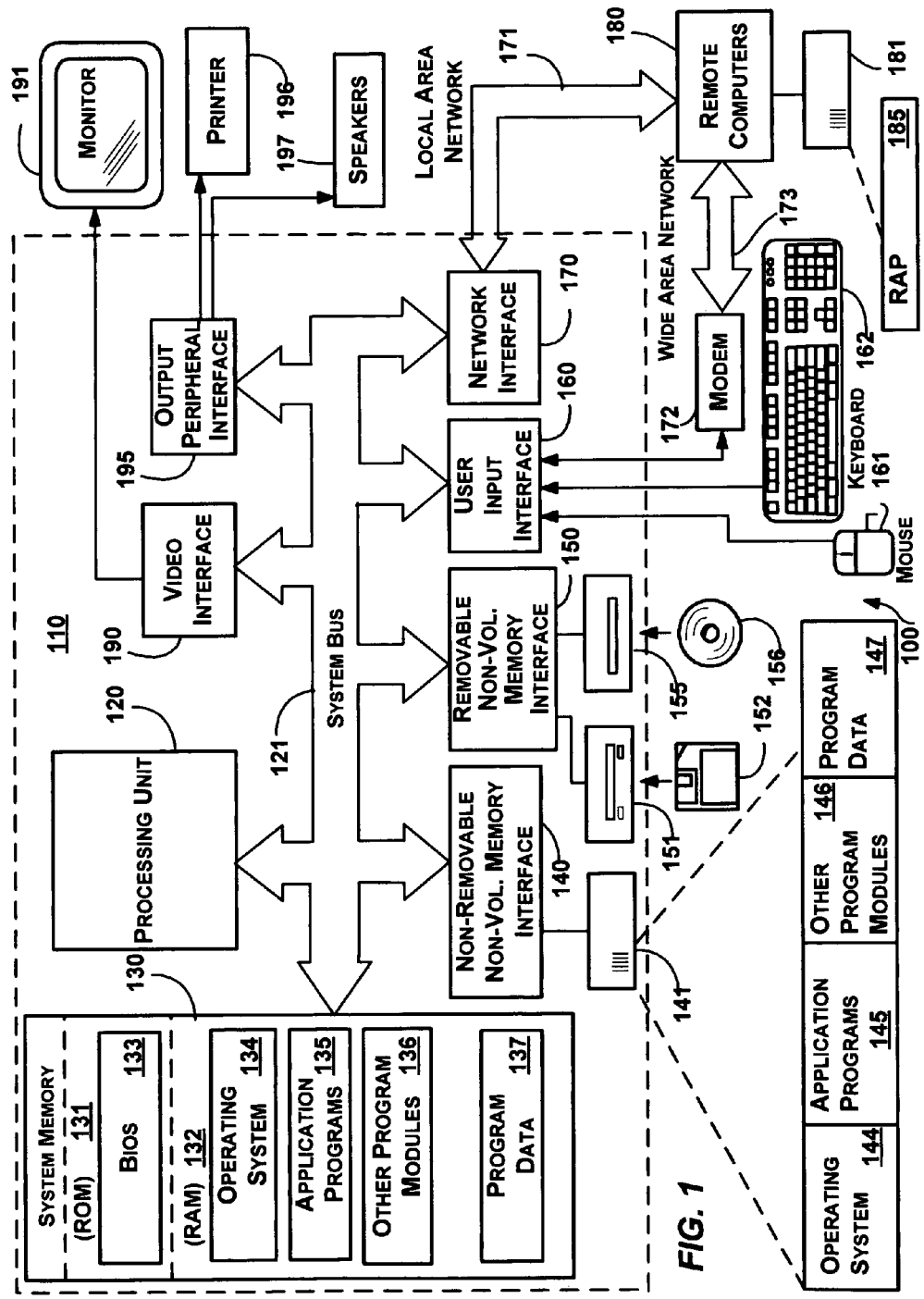
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Shutdown Recovery

As will readily be appreciated, modern machines may process thousands of resource changes in a relatively short period of time. Replicating these resources and keeping them synchronized across hundreds or thousands of machines connected via various networks of varying reliability and bandwidth poses a significant challenge, particularly when abnormal shutdown occurs during replication.

Optimistic, multi-master replication systems allow unrestricted changes to replicated content on any machine participating in a given replica group. A replica group comprises a set of resources which are replicated on machines participating in the replica group. The set of resources of a replica group may span volumes. For example, a replica group may include resources associated with C:\DATA, D:\APPS, and E:\DOCS which may be replicated on a set of machines participating in the replica group. Potentially conflicting changes are reconciled under the control of the replication system using a set of conflict resolution criteria that defines, for every conflict situation, which conflicting change takes precedence over others.

The term "machine" is not limited simply to a physical machine. Rather, a single physical machine may include multiple virtual machines. Replication from one machine to another machine, as used herein, implies replication of one or more members of the same replica group from one machine, virtual or physical, to another machine, virtual or physical. A single physical machine may include multiple members of the same replica group. Thus, replicating members of a replica group may involve synchronizing the members of a single physical machine that includes two or more members of the same replica group.

A resource may be thought of as an object. Each resource is associated with resource data and resource metadata. Resource data may include content and attributes associated with the content while resource metadata includes other attributes that may be relevant in negotiating synchronization and in conflict resolution. Resource data and metadata may be stored in a database or other suitable store; in an alternate embodiment, separate stores may be used for storing resource data and metadata.

In replication systems including data stores based on named files in a file system, resource data may include file contents, as well as any file attributes that are stored on the file system in association with the file contents. File attributes may include access control lists (ACLs), creation/modification times, and other data associated with a file. As used herein, file may include directories (i.e., file system objects that may be associated with descendant files and directories and ancestor directories) and non-directories. Unless the context clearly indicates otherwise, the term file may be read as "resource data." In addition, unless the context clearly indicates otherwise, the term file system may be read as "a data store that stores resource data."

In replication systems including data stores not based on named files in a file system (e.g., ones in which resources are stored in a database or object-based data store), resource data appropriate to the data store is stored. Throughout this document, replication systems based on files in a file system are often used for illustration, but it will be recognized that any data store capable of storing content may be used without departing from the spirit or scope of the subject matter described herein.

For each resource, resource metadata may include a globally unique identifier (GUID), whether the resource has been deleted, a version sequence number together with authorship of a change, a clock value to reflect the time a change occurred, and other fields, such as a digest that summarizes values of resource data and may include signatures for resource content. A digest may be used for a quick comparison to bypass data-transfer during replication synchronization, for example. If a resource on a destination machine is synchronized with content on a source machine (e.g., as indicated by a digest), network overhead may be minimized by transmitting just the resource metadata, without transmitting the resource data itself. Transmitting the resource metadata is done so that the destination machine may reflect the metadata included on the source machine in its subsequent replication activities. This may allow the destination machine, for example, to become a source machine in a subsequent replication activity. Resource metadata may be stored with or separate from resource data without departing from the spirit or scope of the subject matter described herein.

Version vectors may be used when replicating resources. A version vector may be viewed as a global set of counters or clocks of machines participating in a replica group. Each machine participating in the replica group maintains a version vector that represents the machine's current latest version and the latest versions that the machine has received with respect to other machines. Each time a resource is created, modified, or deleted from a machine, the resource's version may be set to a version number equivalent to the current version number for that machine plus one. The version vector for that machine is also updated to reflect that the version number for that machine has been incremented.

During synchronization, a version vector may be transmitted for use in synchronizing files. For example, if machines A (a downstream machine) and B (an upstream machine) engage in a synchronization activity such as a join, machine B may transmit its version vector to A. A subtracts its version vector from the version vector received from B and sends the difference to B. B may then transmit changes for all resources, if any, that have versions in the difference.

Examples of use of version vectors in synchronization have been described in U.S. patent application Ser. No. 10/791,041 entitled "Interval Vector Based Knowledge Synchronization for Resource Versioning", U.S. patent application Ser. No. 10/779,030 entitled "Garbage Collection of Tombstones for Optimistic Replication Systems", and U.S. patent application Ser. No. 10/733,459 entitled, Granular Control Over the Authority of Replicated Information via Fencing and UnFencing".

Figure 2:
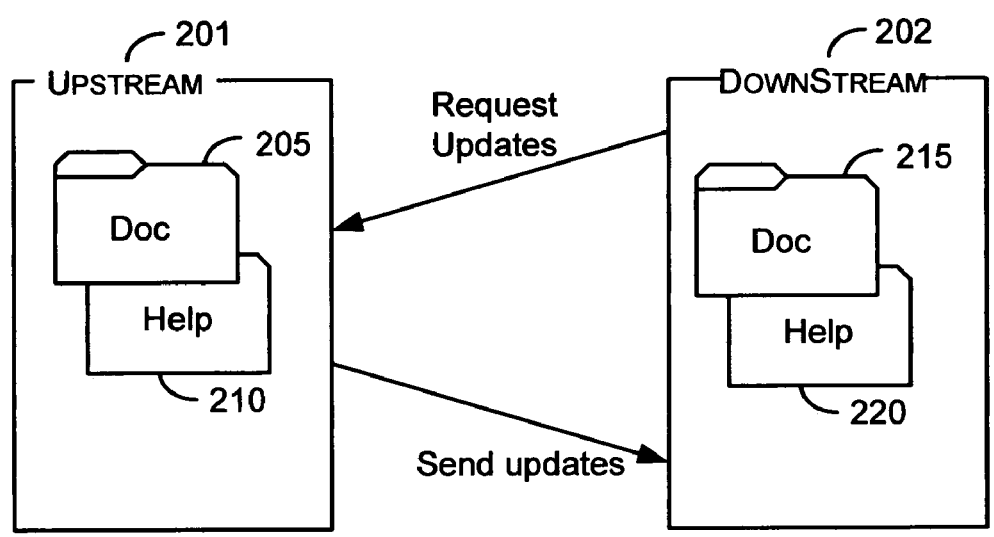
FIG. 2 is a block diagram that generally represents interactions between an upstream machine and a downstream machine in accordance with aspects of the subject matter described herein.

FIG. 2 is a block diagram that generally represents interactions between an upstream machine and a downstream machine in accordance with aspects of the subject matter described herein. As an example, an upstream machine 201 and a destination 202 machine may participate in a replica group that includes two resources. These two resources may include, for example, documents directories 905 and 915 and help directories 910 and 920 (which are given different number on the two machines to indicate that at a particular moment in time, these resources may not include the same resource data—i.e., they may be out-of-sync).

At some point the downstream machine 202 may request updates from the upstream machine 201 and may update its files based on the updates. Although only two machines are shown in FIG. 2, the upstream and downstream machines 201 and 202 may be part of a replication system that includes many other machines. A machine that is a source in one interaction (sometimes called an upstream machine) may later become a destination (sometimes called a downstream machine) in another interaction and vice versa.

Figure 3:
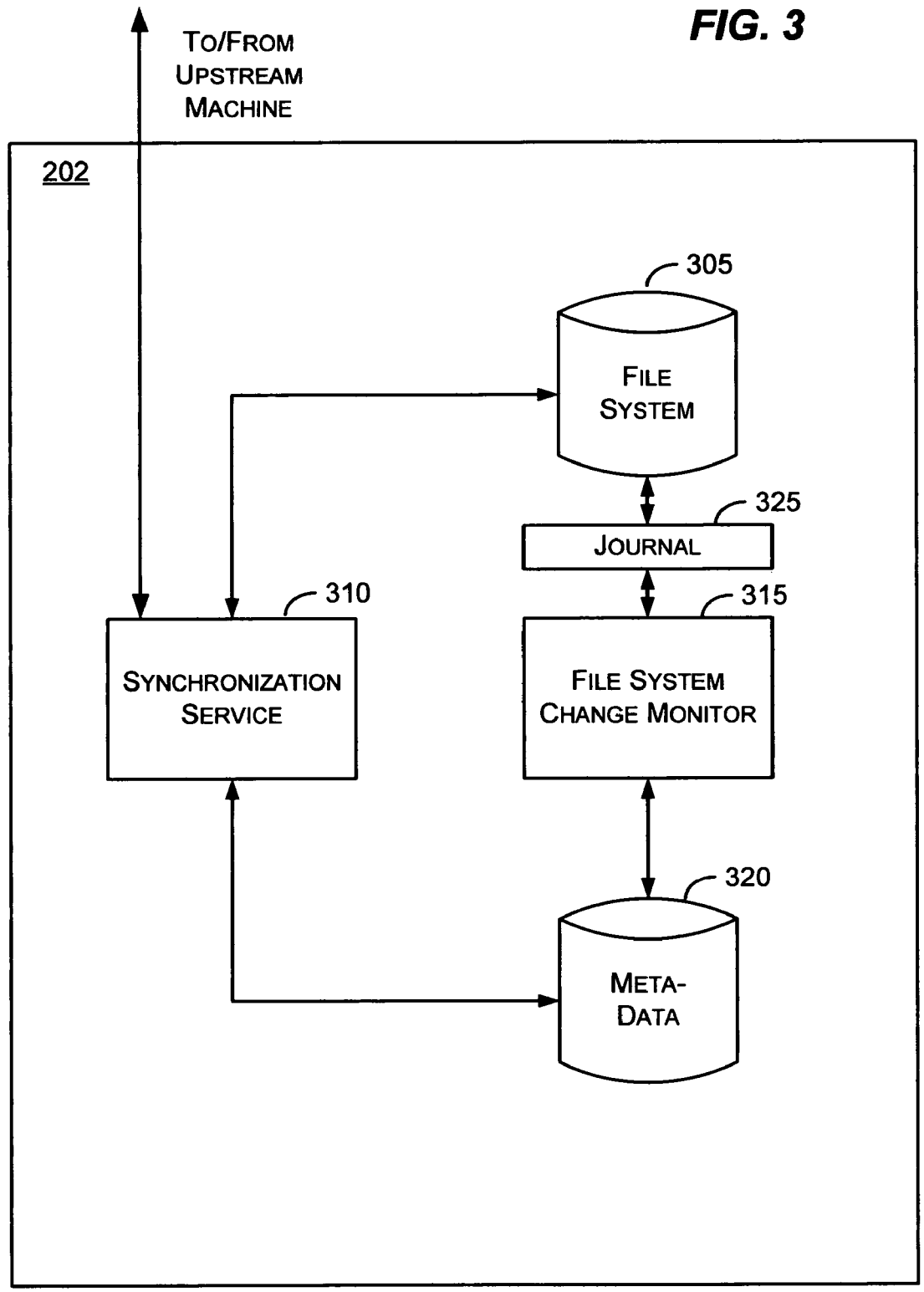
FIG. 3 is a block diagram that generally represents some exemplary components of a downstream machine in accordance with aspects of the subject matter described herein.

FIG. 3 is a block diagram that generally represents some exemplary components of a downstream machine in accordance with aspects of the subject matter described herein. The downstream machine 202 may include, for example, a data store (e.g., file system 305), a synchronization server 310, a file system change monitor 315, a metadata store 320, and a journal 325.

In operation, the downstream machine 202 may establish a connection with an upstream machine (not shown) for a replica group in which both the upstream and downstream machines participate. This may be done through the synchronization service 310, for example. In establishing the connection, each of the partners (i.e., the upstream and downstream machines) may send its version vector to the other partner. Then, a session is established to send updates from the upstream machine to the downstream machine 202.

A session may be used to bind a replicated folder of an upstream machine with its corresponding replicated folder of a downstream machine 202. A session may be established for each replicated folder of a replica group. The sessions for multiple folders may be established over a single connection between the upstream and downstream machines.

After all updates from a session have been processed or abandoned, the downstream machine 202 may close the session.

The downstream machine 202 may request (e.g., via the synchronization service 310) that the upstream machine notify the downstream machine 202 when updates for any resources associated with the session occur. When the upstream machine notifies the downstream machine 202 that updates are available, the downstream machine 202 requests the version vector for the updates. In response the upstream machine sends its version vector (sometimes referred to as "VVup"). Note that VVup may include a complete version vector or a version vector that includes changes since the last version vector was sent. Notifying the downstream machine 202 that updates are available and waiting for the downstream machine 202 to request the updates may be performed in two steps so that a downstream machine 202 is not accidentally flooded with version vectors from multiple upstream partners.

The downstream machine 202 uses the upstream version vector it receives (i.e., "VVup") and computes a set-difference with its own version vector to compute versions residing on the upstream machine of which the downstream machine 202 is unaware. The downstream machine 202 may then request metadata regarding the versions. In requesting the updates, the downstream machine 202 may include a delta version vector that indicates which updates the downstream machine 202 needs.

A downstream machine 202 may request for tombstones or live updates separately or together. A tombstone represents that a resource has been deleted and live updates represent updates that do not delete a resource. In some implementations, the downstream machine 202 may request tombstones before it requests live updates. This may be done to improve efficiency as a resource that has been modified and then deleted does not need to be modified before it is deleted on a replication partner. In addition, processing a tombstone before a live update may clear a namespace of the data store (e.g., file system 305) of the downstream machine 202 in preparation for processing a live replacement update.

After receiving the updates, the downstream machine 202 may begin processing the updates to determine which resource data or portion thereof associated with the updates to request from the upstream machine. This processing, for example, may be performed through the synchronization service 310 which may be broken into multiple components (e.g., communication, synchronization, update, and so forth) (not shown). For example, an update may indicate that a file or portion thereof has been changed. In one embodiment, the entire file may be requested by the downstream machine 202. In another embodiment, a portion of the file that includes the change may be requested by the downstream machine 202. As used herein, an interaction (e.g., request, response, update, and so forth) involving resource data should be understood to mean an interaction involving a portion or all of the resource data associated with a resource. For example, a request for resource data may mean a request for a portion or all of the resource data associated with a resource.

After determining a resource data that needs to be requested, the downstream machine 202 may request the resource data. In response, to a request for resource data, the upstream machine may send the resource data associated with a resource. Requests and responses may continue until all resource data which the downstream machine 202 has determined needs to be updated has been requested. Note, that not all resource data may be sent as an upstream machine may no longer have a requested resource data if the resource has been deleted, for example. Another example in which resource data may not be sent is if the only effective change relative to the downstream machine 202 is that the resource was renamed or that metadata attributes were updated. In such cases, receiving the update and renaming a local resource or updating local metadata may be all that is needed to synchronize the downstream resource with the upstream resource.

A session may be closed, for example, if a replicated folder is deleted, if a non-recoverable error occurs during replication, or if a replication system is shut down. Otherwise, the established session may be used for subsequent synchronization actions that involve all or a portion of the events above.

The synchronization service 310 may use a database (e.g., metadata store 320) to keep track of file and directory states of content sets in the file system 305. Each time a resource is updated, the resource may be assigned a new version in the database.

The synchronization service 310 may receive updates from an upstream partner and update local resources so that they are in sync with replicated resources on other members participating in the replica group. Updates to the resource metadata may be stored in the metadata store 320 while updates to the resource data may be stored in the file system 305. In one embodiment, the file system 305 and the metadata store 320 may be included on the same volume or physical device (e.g., hard drive).

The file system 305 may also be changed by local file activity related to the file system 305. For example, the downstream machine 202 may serve as a file server to many client machines (not shown). The client machines may access and modify files on the downstream machine 202. A file system change monitor 315 may monitor for changes to replicated files by examining a journal 325 to which the file system 305 writes when changes occur. When a replicated file changes, the file system change monitor 315 may update the metadata store 320 to indicate the update. This may serve to keep the metadata store 320 in sync with the file system 305 and for synchronization between replica group members.

An update to the file system 305 may not be atomic with a corresponding update to the metadata store 320. In other words, it is possible that an update may be made to a replicated file of the file system 305 without a corresponding update being made to the metadata store 320. This may occur, for example, because of a dirty shutdown.

Examples of dirty shutdowns include shutdowns that affect the synchronization service 310, shutdowns that affect the machine (e.g., downstream machine 202) upon which the synchronization service 310 is executing, and shutdowns that affect volumes (e.g., file system 305 or metadata store 320) upon which replicated resources are stored.

When the synchronization service 310 crashes (e.g., terminates abnormally), gets killed, or terminates itself because of lack of resources, this is one type of dirty shutdown (sometimes referred to as a "synchronization service dirty shutdown"). When the downstream machine 202 crashes or loses power while the synchronization service 310 is executing, this is another type of dirty shutdown (sometimes referred to as "machine dirty shutdown"). When the file system 305 or the metadata store 320 loses power, gets disconnected, or is forced to dismount while the synchronization service 310 is executing, this is another type of dirty shutdown (sometimes referred to as "volume dirty shutdown").

Both machine dirty shutdown and volume dirty shutdown may cause a file system to lose changes that have not been flushed to disk. In one embodiment, as far as the synchronization service 310 is concerned, machine dirty shutdown and volume dirty shutdown are the same. Thus, aspects of the subject matter described herein with respect to machine dirty shutdown may also be applied to volume dirty shutdown. In one implementation, the synchronization service 310 makes no distinction between machine and volume dirty shutdowns as both may be treated the same as far as the synchronization service 310 is concerned.

In another implementation, however, the synchronization service 310 may treat machine dirty shutdown and volume dirty shutdown differently. For example, data regarding updates to a volume may be stored outside the volume (e.g., in a registry or system volume) such that volume dirty shutdowns may be recovered using the data.

Dirty Shutdown Scenarios

The metadata store 320 may become inconsistent with the file system 305 after dirty shutdown. Inconsistent, in this sense, means that the state stored in the metadata store 320 does not match the state on the file system 320. For example, the metadata store 320 may not have a new version for file that has been updated in the file system 305. At least two reasons why inconsistency may occur include:

1) A synchronization service dirty shutdown may interrupt a synchronization service update, which may not be atomic, leaving files updated in the file system 305 for which updates are not reflected in the metadata store 320.

2) A machine dirty shutdown may cause the file system 305 to lose some file system changes for which corresponding updates in the metadata 320 have already been recorded.

Without proper detection and remedy, this may cause a content set member (i.e., the content on one of the members participating in the replica group) to diverge or may even prevent the synchronization service 310 from working properly on the member.

Below is some notation that is used for convenience in describing aspects of the subject matter described herein. The file system state and metadata state of involved resources may be represented with a tuple: [FS versions, DB versions], using the following notations:

| | |
|---|---|
| V: | old version |
| Vn: | new version |
| <Vn>: | new tombstone version |
| <V>: | deleted file in file system |
| {Vn}: | a new version of a file placed in an Installing directory (i.e., a directory to which files are copied in preparation for installing them into a replicated folder) in file system |
| Vn': | a new version of a file placed in a wrong place inside a content set |
| —: | does not exist |

Synchronization Service Dirty Shutdown

A synchronization service dirty shutdown may occur in the middle of installing an update from upstream partner. The metadata store 320 (hereinafter sometimes referred to as the "database") may get out of sync with the file system 305 if the synchronization service 310 crashes after it has made an update to the file system 305 but before it updates the database. In some cases, the synchronization service 310 may recover automatically after it is restarted and synchronization with its upstream partner resumes. In other cases, additional actions may need to be taken to recover from the dirty shutdown.

In one implementation, a file system change monitor 315 may not be affected by a synchronization service dirty shutdown. To accomplish this, the file system change monitor 315 may commit in a database the last file change it was able to update each time it updates the database. An operating system component may indicate file changes by writing a sequence number and change type to a journal (e.g., journal 325). After a restart from a dirty shutdown, the file system change monitor 315 may read a sequence number corresponding to the last file it was able to update and may resume updating any other metadata corresponding to files indicated by the journal.

In one implementation, the synchronization service 310 may install an update in at least the following four different ways depending on the type of the change. Conflict handling is listed separately.

1) Install-Rename

The synchronization service 310 may install a file by renaming and deleting the old version and moving the new version from an Installing directory to its final destination in the content set.

| | |
|---|---|
| Step 1: rename-delete old version | [<V>{Vn}, V] |
| Step 2: rename-install new version | [<V>Vn, V] |
| Step 3: update database | [<V>Vn, Vn] |

If dirty shutdown happens between step 1 and step 2, the old version is deleted from the file system 305, the new version is not installed, and the database is not updated. This scenario may be recovered automatically when synchronization service 310 restarts and resumes synchronization with its partner.

If dirty shutdown happens between step 2 and step 3, the old version is deleted from the file system 305, the new version is installed on the file system 305, and the database is not updated. This scenario may be more difficult to recover from because when the synchronization service 310 restarts and tries to install the update again, the synchronization service 310 will see the new version in the content set without an up-to-date database record. But, the synchronization service 310 may not know whether the new version is due to a local change, or was put there previously by the synchronization service 310. In one implementation, the synchronization service 310 may block and wait, hoping that the new version is a local change and that the database will be brought up-to-date by the file system change monitor 315.

Furthermore, if after restart, the file has been moved to a different location, the synchronization service 310 may not even detect there was an intermediate version left somewhere in the content set. In one embodiment, in this case, a bit (e.g., USN_REASON_REPLICATION_MANAGEMENT) in a journal may be used during restart.

2) Install-Overwrite

The synchronization service 310 may install a directory update by updating the directory in-place. If the directory is also to be moved to a different location, the synchronization service 310 may also move the directory.

| | |
|---|---|
| Step 1: update the old version | [Vn', V] |
| Step 2: rename or move if necessary | [Vn, V] |
| Step 3: update the database | [Vn, Vn] |

If the crash happens between step 1 and step 2, or between step 2 and step 3, there may be a new version in the content set but an old version in the database. This scenario may be more difficult to recover from for the reasons described above with respect to Install-Rename.

3) Install-Move

If an update to a file or directory only changes its name and/or location, the synchronization service 310 may install the update by doing a local move.

| | |
|---|---|
| Step 1: rename or move the old version | [Vn, V] |
| Step 2: update the database | [Vn, Vn] |

If the crash happens after step 1 and before step 2, there may be a new version in the file system 305 but an old version in the database. This scenario may be more difficult to recover from for the reasons described above with respect to Install-Rename.

4) Install-Tombstone

A tombstone may be installed by moving out and deleting a file.

| | |
|---|---|
| Step 1: rename-delete the old version | [<V>, V] |
| Step 2: update the database | [<V>, <Vn>] |

If the crash happens after step 1 and before step 2, the database may indicate that the file is live but the file may be deleted from the file system 305. The synchronization service 310 may recover from this state by communicating with an upstream partner and updating the database to indicate that the file is deleted.

5) Conflict-Loser

The synchronization service 310 may also handle name conflicts (e.g., conflicts in which a file is to replace another file having the same name). The synchronization service 310 may move the name-conflicting loser to a special directory (e.g., a Conflict directory) and tombstone the name-conflicting loser and/or all of its children in the database. This may happen before Install-Rename and Install-Move.

| | |
|---|---|
| Step 1: move loser to Conflict directory | [{V}, V] |
| Step 2: tombstone loser ID record(s) | [{V}, <Vn>] |

If crash happens between step 1 and step 2, the database may indicate that there are live files, but the files may have already been deleted from the file system 305 (e.g., moved to the Conflict directory) for purposes of the synchronization service 310.

Machine Dirty Shutdown

File system operations made by the synchronization service 310 or other applications may be lost if the operations have not been flushed to disk when a machine dirty shutdown occurs. At the same time, however, database updates made by the synchronization service 310 based on those updates may have been flushed to disk. This may cause the database to become inconsistent with the file system 305.

If the database updates are lost and the file updates are not, the same inconsistencies described above with respect to synchronization service dirty shutdown may occur. Following are some exemplary scenarios which may be handled by aspects of the subject matter described herein.

1) Install-Rename

| | |
|---|---|
| Step 1: rename-delete old version | [<V>{Vn}, V] |
| Step 2: rename-install new version | [<V>Vn, V] |
| Step 3: update database | [<V>Vn, Vn] |
| Step 4: crash | [V, Vn] or [<V>{Vn}, Vn] |

If the change from step 2 is lost, the database may reflect the new version, but the new version of the file may still be in an installation directory and not part of the content set.

If the changes from both step 1 and step 2 are lost, the database may reflect the new version, but the file system may include the old version.

Note that some file systems (e.g., NTFS) may guarantee transaction ordering of changes involving metadata. In such file systems, for example, if step 1 is lost, step 2 is also lost.

2) Install-Overwrite

| | |
|---|---|
| Step 1: update the old version | [Vn', V] |
| Step 2: rename or move if necessary | [Vn, V] |
| Step 3: update the database | [Vn, Vn] |
| Step 4: crash | [V, Vn] or [Vn', Vn] |

If the change from step 2 is lost, the database may reflect the new version, but the new version in the file system may be in the wrong place.

If the changes from both step 2 and step 1 are lost, the database may reflect the new version, but the file system may still include the old version.

3) Install-Move

| | |
|---|---|
| Step 1: rename or move the old version | [Vn, V] |
| Step 2: update the database | [Vn, Vn] |
| Step 3: crash | [V, Vn] |

If the change from step 1 is lost, the database may reflect the new version, but the file system may still include the old version.

4) Install-Tombstone

| | |
|---|---|
| Step 1: rename-delete the old version | [<V>, V] |
| Step 2: update the database | [<V>, <Vn>] |
| Step 3: crash | [V, <Vn>] |

If the change from step 1 is lost, the database may include a tombstone for the update, but the file system may still include a live file.

In one embodiment, file system change losses may be avoided by flushing these updates before updating the database. In some implementations, however, this approach may perform poorly.

5) Conflict-Loser

| | |
|---|---|
| Step 1: move loser to Conflict directory | [{V}, V] |
| Step 2: tombstone loser ID record(s) | [{V}, <Vn>] |
| Step 3: crash | [{V}, <Vn>] |

If the change from step 1 is lost, the database may include a tombstone for the update, but the file system may still include a live file.

6) Create New File (Create, Move-In)

An application may create a file in a replicated folder or may move the file into the replicated folder. When this happens, the file system change monitor 315 may create a new metadata record in the database.

| | |
|---|---|
| Step 1: application creates (or moves in) resource | [V, —] |
| Step 2: updates the database | [V, V] |
| Step 3: crash | [—, V] |

If change from step 1 change is lost, we have a live record in the database for a file that does not exist in the file system.

7) Tombstone (or Delete) File (Delete, Move-Out)

An application may delete a file from a replicated folder or may move the file out of the replicated folder. The file system change monitor 315 may update the database to tombstone the file in the database.

| | |
|---|---|
| Step 1: delete (or move out) resource | [<V>, V] |
| Step 2: update the database | [<V>, <Vn>] |
| Step 3: crash | [V, <Vn>] |

If the change from step 1 is lost (e.g., not flushed to disk), there may be a tombstone (or no record) in the database but a live file in the file system.

8) Local Move

An application may move a resource from one location of a replicated folder to another of the replicated folder. In response, the file system change monitor 315 may update a record in the database.

| | |
|---|---|
| Step 1: application moves resource | [Vn, V] |
| Step 2: updates the database | [Vn, Vn] |
| Step 3: crash | [V, Vn] |

If change from step 1 is lost, there may be a record in the database with the wrong name and/or parent information.

Although some scenarios in which a replication database may become inconsistent with a file system have been described above, it will be recognized that other scenarios may occur that may be handled by aspects of the subject matter described herein.

Dealing with Dirty Shutdowns

While some approaches for dealing with or avoiding inconsistencies associated with dirty shutdowns have been described above, other approaches are described below.

In one embodiment, a flag is set and reset in non-volatile storage to determine whether a synchronization service dirty shutdown has occurred. When the synchronization service 310 first begins to execute after it has been started, the synchronization service 310 may retrieve the current state of the flag from the non-volatile storage. If the flag is set, the synchronization service 310 may determine that a synchronization service dirty shutdown has occurred. If the flag is not set, the synchronization service 310 sets the flag. If the synchronization service 310 is able to cleanly shut down, just before it does shut down, the synchronization service 310 resets the flag.

In one embodiment, the dirty flag is persisted in the metadata store 320. In another embodiment, the dirty flag is persisted as a file that is renamed from dirty to clean whenever the synchronization service 310 is cleanly shut down. There may be one dirty flag per volume. If the synchronization service 310 is terminated abnormally, the flag will remain set. Upon reboot, the synchronization service 310 can determine that a synchronization service dirty shutdown occurred by examining the flag.

In one implementation, the dirty flag may be set just before the synchronization service 310 starts installing updates or just before the file system change monitor 315 updates the metadata store 320.

While a similar approach may be able to be used to detect machine dirty shutdown, finding out if there are any lost file system changes may be more effective. To find out if there are any lost file system changes, the journal discussed previously may be used.

Some file systems (e.g., NTFS) update file system metadata (not to be confused with resource metadata) using transactions. In one embodiment, a transaction has a property such that either every operation in a group of operations associated with the transaction succeeds, or the tangible effects of the operations in the group are undone (also known as rolled back). For example, a bank transfer may be implemented as an atomic set of two operations: a debit from one account and a credit to another account. If the two operations do not both succeed, then the transfer is either unfairly in favor of the bank or the account holder. Thus, either both succeed in a transaction or the tangible effects (e.g., data stored to disk or memory) of any that did succeed are undone.

In one embodiment, updates on file system metadata and journal entries associated therewith are performed using transactions. If a create/delete/rename update is lost (e.g., by being rolled back during system recovery), the corresponding journal entry is lost too. Based on this, the file system change monitor 315 may save the sequence number and timestamp of the last journal entry read by the file system change monitor 315.

After the resource replication components (e.g., the synchronization service 310 and the file system change monitor 315) restart (e.g., after a shutdown or crash), first, a check is performed as to whether there was a synchronization service dirty shutdown. If so, a further check is performed to determine if there are any lost file system changes with respect to the resource replication components. This may be done by reading the journal entry corresponding to the saved sequence number and comparing its timestamp with the saved timestamp. If there is a valid journal entry having the saved sequence number and the timestamp of the journal entry matches the saved timestamp, then it may be determined that the journal entry and all previous journal entries were not lost. This means that for the file system change monitor 315 that the file system updates succeeded as well as metadata store 320 updates. Otherwise, the journal entry and its associated file system changes may be lost (or undone).

In one implementation, both the last read journal entry and the last processed journal entry may be persistently stored (e.g., in nonvolatile storage). If the last read journal entry is lost, but the last processed journal entry is not lost, it may be determined that the file system 305 and metadata store 320 are in a consistent state.

In some file systems, it is possible that a change to file system metadata is lost but that the journal entry is not undone. This may occur when changes occur outside a transaction, such as when a user application makes changes to resource data. To determine whether resource data has been changed, other attributes included in the resource metadata may be checked against the resource data associated with the journal entry. For example, a digest stored in the resource metadata may be used to determine whether the resource data has changed. If the resource data has changed, the resource metadata for the resource may be updated to reflect the change.

In addition to verifying that the metadata store 320 has been updated by the file system change monitor 315 for changes made to the file system 305 up to the stored sequence number, consistency of the synchronization service 310 changes to the file system 305 and the metadata store 320 may also be verified. To achieve this, records in the metadata store 320 may be scanned to obtain their sequence numbers. If the sequence number of all records in the metadata store 320 is no greater than the saved sequence number mentioned previously, it may be determined that corresponding file system changes are not lost. If the sequence number for a record in the metadata store 320 is greater than the saved sequence number, but there is no valid sequence number in the journal, it may be determined that the corresponding file system change is lost.

If there is a valid sequence number in the record (e.g., the sequence number is available in the journal), a check may be performed as to whether the sequence number corresponds to the one recorded in the metadata store 320. In one implementation, a timestamp comparison between the timestamp stored in the record in the metadata store 320 and the timestamp stored in the journal is performed. If the timestamp in the journal is older than the timestamp of the metadata record, then the records correspond. Otherwise, the change has been lost.

In another implementation, additional attributes are compared to catch instances where the system time has been set back. Such attributes may include:

1) file reference number (sometimes referred to as "fid")
2) source info flag
3) name If any sequence number included in the metadata store 320 is not in the journal it may be determined that there has been both a dirty shutdown and a journal wrap (or loss). In this case, to ensure correctness, it may be determined that this indicates that file system changes were lost. There may or may not have been changes lost, but in one embodiment, to err on the safe side, having a sequence number in the metadata store 320 that is not in the journal may be treated as if there were changes lost.

Recovery from Synchronization Service Dirty Shutdown

A synchronization service dirty shutdown may be detected by examining the flag previously mentioned. Furthermore, it may be determined that only a synchronization service dirty shutdown occurred if the last saved sequence number is valid and no record in the metadata store 320 includes a sequence number greater than the last saved sequence number.

Some inconsistent states that can occur after a synchronization service dirty shutdown are as follows:

1) [<V>{Vn}, V]
2) [Vn, -]
3) [<V>Vn, V]
4) [Vn', V]
5) [Vn, V]
6) [<V>, V]
7) [{V}, V]

These states have several features. For example, the database may still have the old version. The file system may have the new version. The new version may or may not be in the content set. If the new version is in the content set, it may or may not be at the right location. The new version could also be a deleted file. In the cases listed above, the old version is deleted from the file system.

The synchronization service 310 may automatically recover from 1), 6) and 7) above when synchronization with an upstream partner resumes. Since it is possible to have both a live file without a corresponding record in the database and a live record in the database without a live file, the file system 305 and the records in the metadata 320 may be scanned. If a file in the file system is encountered that does not have a corresponding record in the database, a new record in the database may be created. If a record in the database is found that does not have a corresponding file in the file system, the record may be tombstoned (e.g., marked for deletion). Scanning the file system and database and adding new records and/or tombstoning existing records is sometimes referred to as journal wrap recovery.

A file might be missing from a content set due to a synchronization service dirty shutdown during an intermediate state. In this case, journal wrap recovery may tombstone a record corresponding to the file in the database. This may potentially replicate to other members participating in the replica group and delete the file on the other members causing data loss. To avoid this, the record in the database may be given a lower fence value (e.g., than it currently has) to ensure that updating the tombstone to other members loses to updates (including the update that was installed before dirty shutdown) from other members.

It is also possible for an intermediate version of a file to re-appear and replicate to other members participating in the replica group. This may occur, for example, if a synchronization service dirty shutdown occurred after step 2 during Install-Rename. If the file is moved to a different location on an upstream partner and synchronization resumes, the last version may be installed at the last location. In addition, however, an intermediate version left from dirty shutdown may also get a new record in the database and replicate to other members participating in the replica group. In some embodiments, replicating an intermediate version may be allowed as there is no data loss (even though an additional file, i.e., the intermediate version, is introduced into the replica group).

Recovery from Machine Dirty Shutdown

Following are three exemplary scenarios and recovery actions for each scenario.

Case 1: file changes are lost from the synchronization service but not from the file system change monitor.

In this case, the replication components detect that the last saved sequence number is valid. Records in the database whose sequence numbers are greater than the last saved sequence number are no longer valid. To fix these records multiple actions may occur. First, their versions are removed from the downstream machine 202's version vector. Then, if the corresponding file (based on fid) does not exist or is not in the content set, the metadata record is tombstoned with a lower fence value; otherwise, the metadata record is assigned a new version with a lower fence value.

In some file systems each file is assigned an ID that is unique on a volume. The ID may be used to open a handle to the file. This file ID is sometimes referred to herein as "fid."

Pseudocode that describes recovery actions is as follows:

```
for each database record
    if its file system change is lost:
        fix the version vector by removing its version
        fix the database record by
            assigning a new version
            assigning lower fence value
            changing fid if necessary
            tombstoning the record if there is no
corresponding file in the content set.
```

A fid may need to be changed if a parent object in the file system (e.g., a directory) has a child object (e.g., another directory or file) identified by one fid and the database record has the fid identified by a different fid.

In an alternative embodiment, recovery actions may occur as follows:

```
    for each database record
        if its file system change is lost:
            fix the version vector by removing its version
            delete the database record
            obtain the database record from an upstream
partner.
```

In addition, a journal wrap recovery may be executed. The above actions may be performed before the journal wrap recovery so that tombstones (even with lower fence values) do not replicate out.

Case 2: file changes are not lost from the synchronization service but are lost from the file system change monitor.

In one implementation, when the saved sequence number is not valid, it may be difficult or impossible to determine if file changes were also lost from the synchronization service. In this implementation, actions corresponding to case 3 below may be taken.

In another implementation, more than one sequence number may be saved. If one of them is valid, and all other sequence numbers in the database are no greater than it, then no file system changes have been lost by either the synchronization service or the file system change monitor. If none of the saved sequence numbers are valid, consistency may be obtained as described below in conjunction with case 3.

In one embodiment, to simplify implementation, only one sequence number may be saved. If during recovery it is determined that the saved sequence number is not valid, recovery may proceed as described below in conjunction with case 3.

Case 3: file changes are lost from both the synchronization service and from the file system change monitor.

This case may occur when no saved sequence number is valid. Without a valid saved sequence number, the fix-up work described in case 1 may not yield a correct result. Without that fix-up work, it may not be safe to perform journal wrap recovery. To recover in this case, the database may be rebuilt. This may involve deleting the database, initializing a new one, and commencing synchronization or tombstoning the records in the database and fencing the records so that they do not replicate out.

Figure 4:
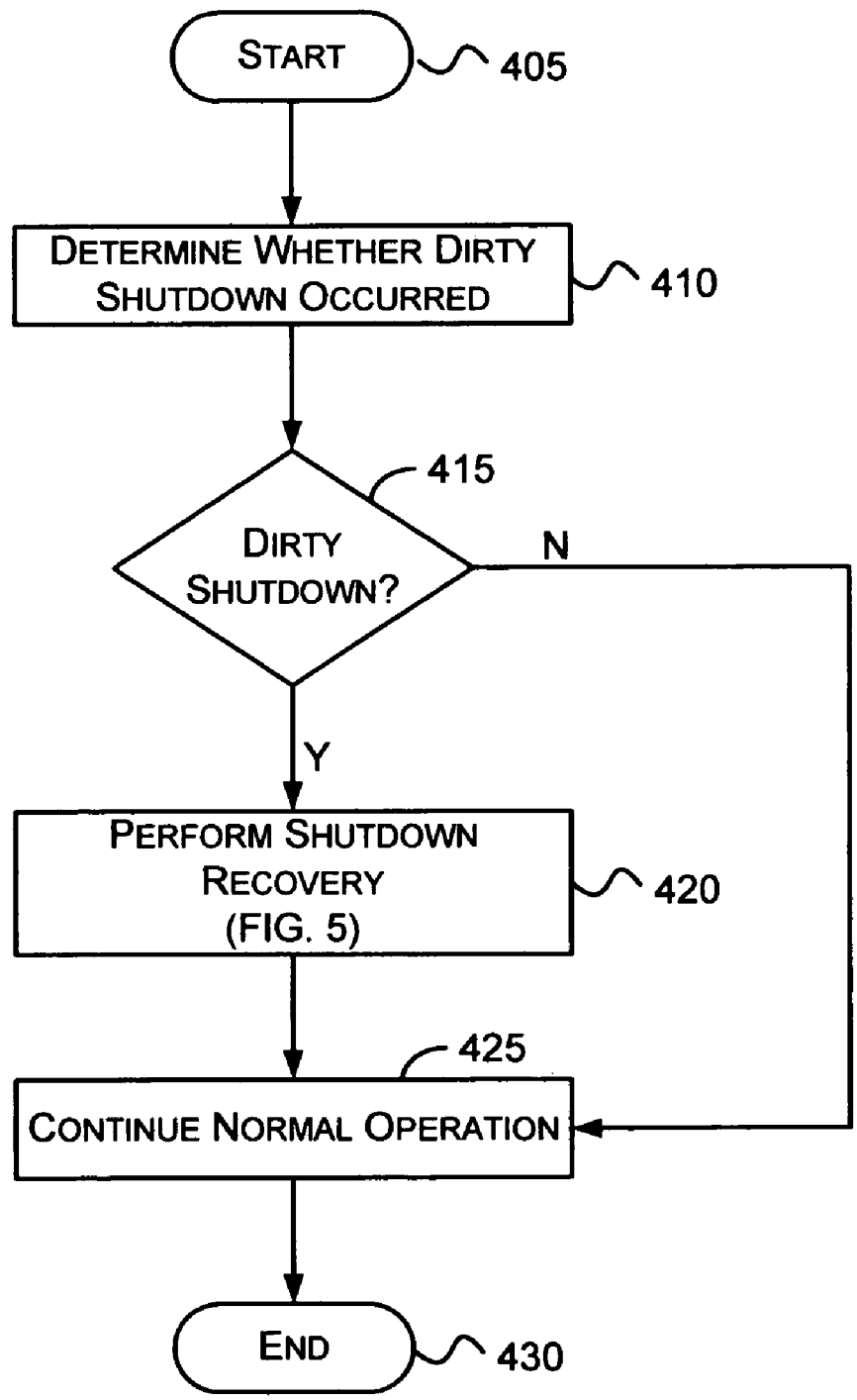
FIGS. 4-7 are flow diagrams that generally represent actions that may occur in shutdown recovery in accordance with aspects of the subject matter described herein.

FIGS. 4-7 are flow diagrams that generally represent actions that may occur in shutdown recovery in accordance with aspects of the subject matter described herein. Turning to FIG. 4, the actions start at block 405.

At block 410, a determination as to whether a dirty shutdown has occurred is made. This may be done by checking a flag (or file) as described previously.

At block 415, if a dirty shutdown has occurred, the actions continue at block 420; otherwise, the actions continue at block at block 425.

Figure 5:
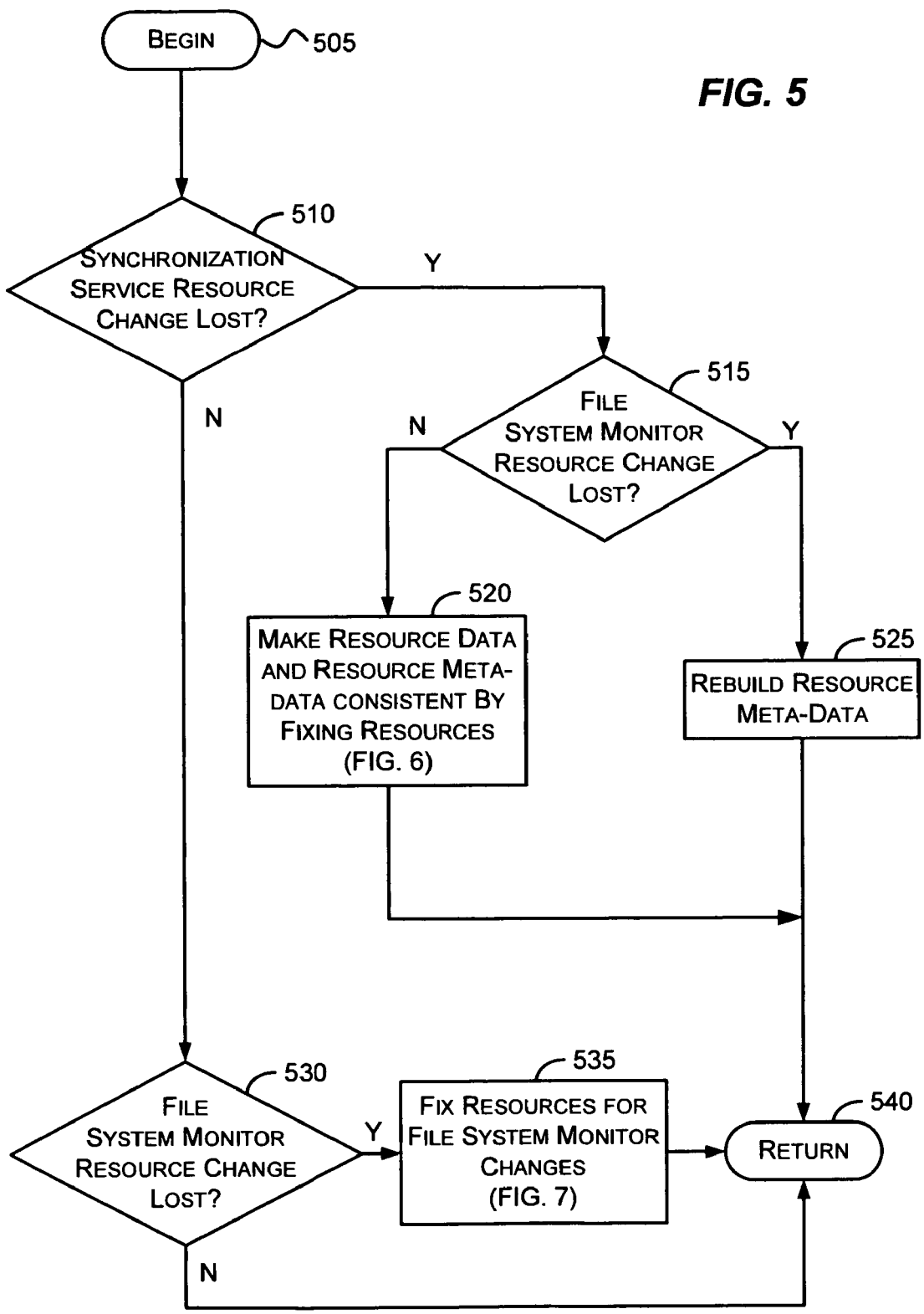

At block 420, shutdown recovery actions are performed as described in more detail in conjunction with FIG. 5.

At block 425, the synchronization components continue normal operation. As an early step, this may include setting the flag mentioned above.

At block 430, the actions end.

Turning to FIG. 5, the actions begin at block 505. At block 510, a determination is made as to whether any resource data update was lost for a resource metadata change made by the synchronization service. If so, the actions continue at block 515; otherwise, the actions continue at block 530. If the sequence numbers of all records in the metadata store 320 are no greater than the saved sequence number mentioned previously, it may be determined that corresponding resource data changes have not been lost.

At block 515 a determination is made as to whether any resource data update was lost for a file system monitor metadata change. If so, the actions continue at block 525; otherwise, the actions continue at block 520. This may be determined as mentioned previously.

Figure 6:
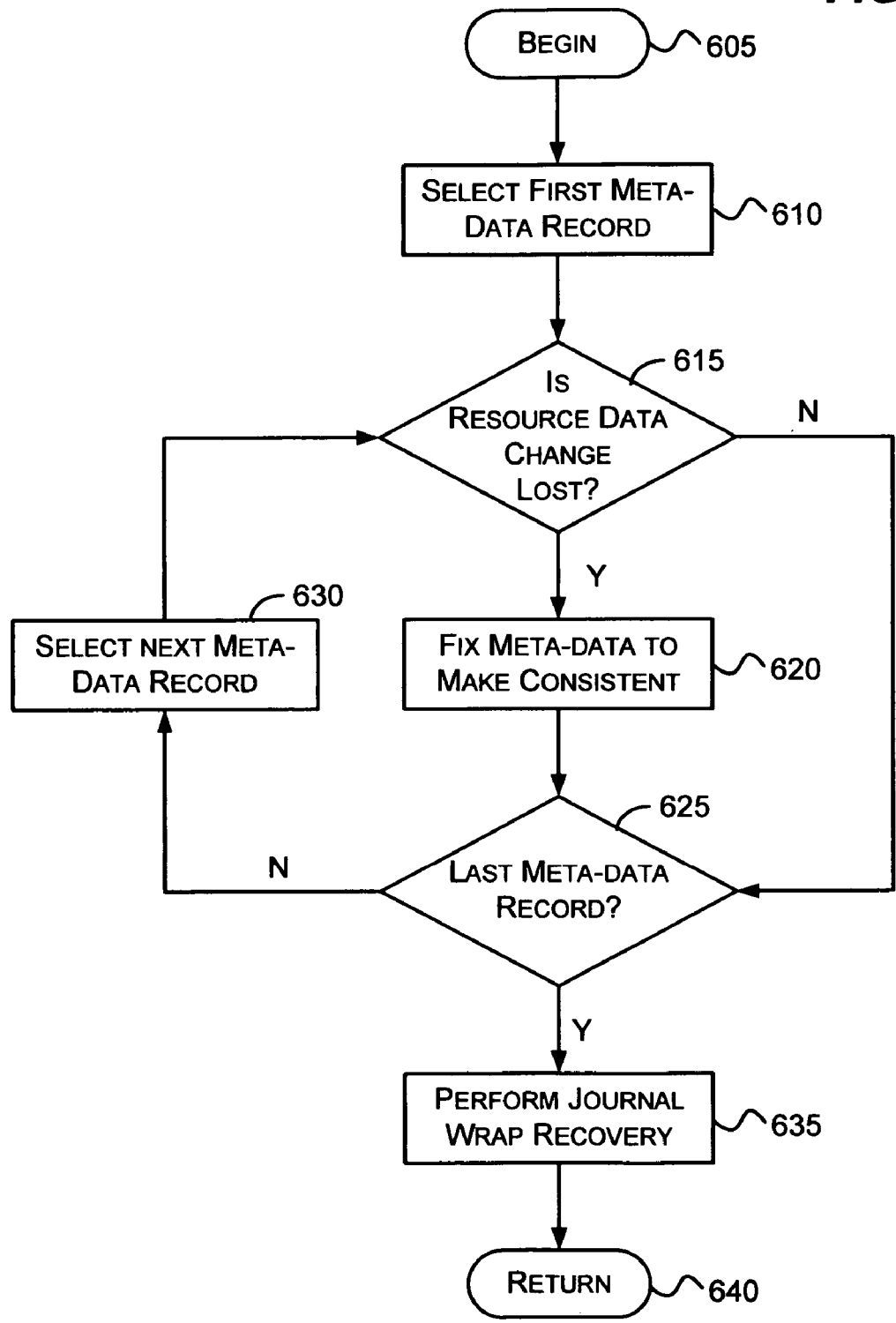

At block 520, the resource data and resource metadata is made consistent by fixing resources as described in more detail in conjunction with FIG. 6.

At block 525, resource metadata is rebuilt. This may be done by tombstoning and setting a sufficiently low fence value on each of the records in the metadata and allowing synchronization to occur.

At block 530 a determination is made as to whether any resource data update was lost for a file system monitor resource metadata change. If so, the actions continue at block 535; otherwise, the actions continue at block 540. It may be the case that even though a dirty shutdown occurred, that all changes were flushed to the volume. In that case, nothing else needs to be done to make the resource data consistent with the resource metadata.

Figure 7:
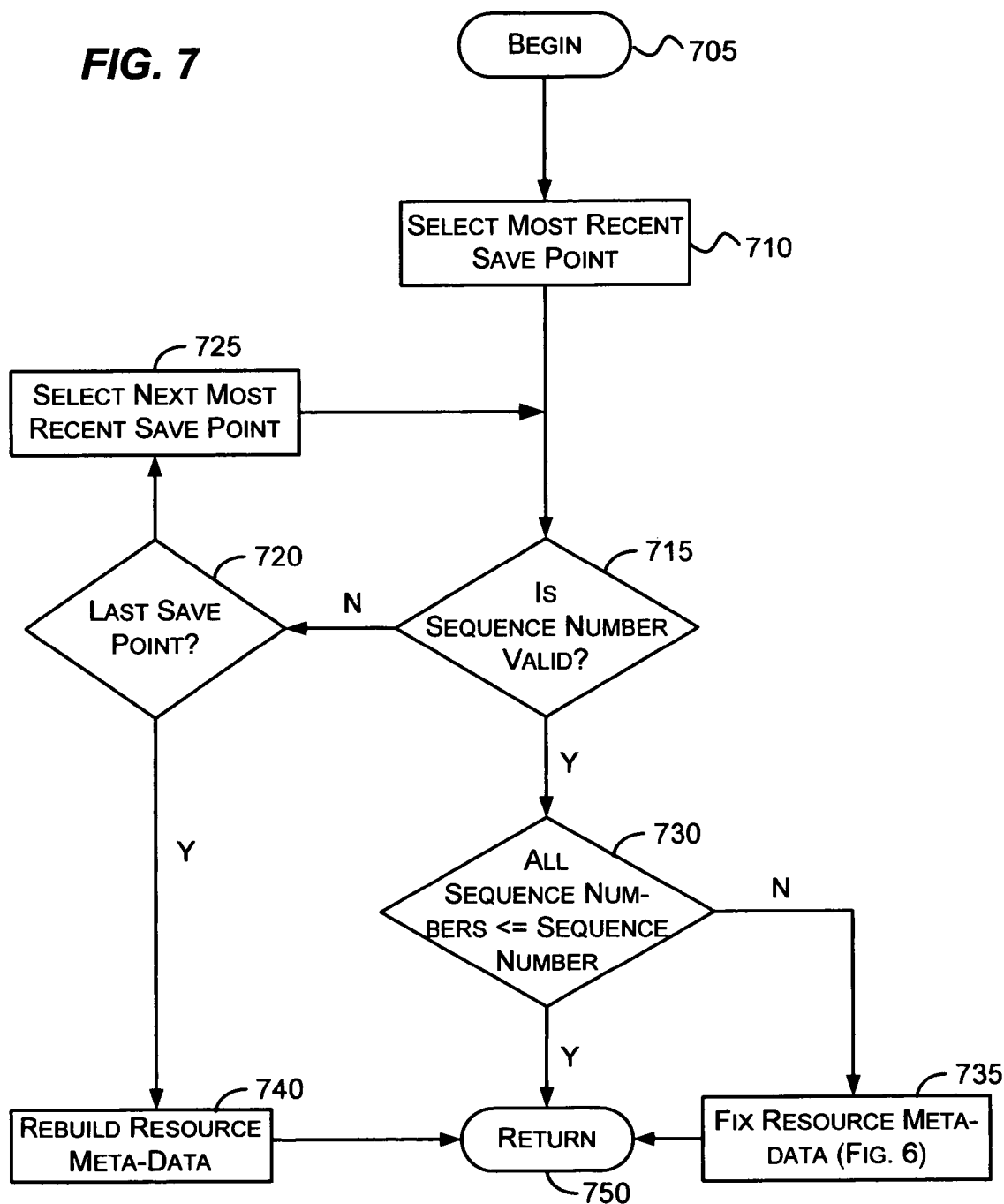

At block 535, resources associated with the file system monitor changes are fixed as described in more detail in conjunction with FIG. 7.

At block 540, the actions return.

In an alternative embodiment, first a check is made as to whether file system resource changes have been lost. If the changes have been lost, resource meta-data is rebuilt as described in conjunction with block 525 without checking if changes have also been lost from the synchronization service. If changes are not lost from the file system monitor, then a check is performed as to whether changes from the synchronization service have been lost. If so the actions associated with block 520 are performed. If not, the actions continue at block 540.

Turning to FIG. 6, the actions begin at block 605. At block 610, the first metadata record is selected for examination.

At block 615, if the resource data change associated with the metadata record is lost, the actions continue at block 620; otherwise, the actions continue at block 625.

At block 620, the metadata is fixed to make it consistent as described in more detail in conjunction with case 1 above.

At block 625, a determination is made as to whether the currently-selected metadata record is the last metadata record. If so, the actions continue at block 625; otherwise, the actions continue at block 630.

At block 630, the next metadata record is selected. The actions associated with blocks 615-630 continue until all metadata records have been selected.

At block 635, a journal wrap recovery is performed as described in more detail previously.

At block 640, the actions return.

Turning to FIG. 7, at block 705, the actions begin. At block 710, the most recent save point is selected. Save point refers to the most recent sequence number saved in persistent storage. In some embodiments, only one sequence number is saved. In other embodiments, multiple sequence numbers may be saved.

At block 715, a determination is made as to whether the sequence number is valid. If so the actions continue at block 730; otherwise, the actions continue at block 720. The sequence number may be valid if it is contained in the journal and the saved timestamp matches the one in the journal.

At block 720, a determination is made as to whether the currently-selected save point is the last save point. If so, the actions continue at block 740; otherwise, the actions continue at block 725. At block 725, the next most recent save point is selected.

At block 730, a determination is made as to whether all sequence numbers in the resource metadata are less than or equal to the currently selected sequence number. If so, the actions continue at block 750; otherwise, the actions continue at block 735. If all sequence numbers in the resource metadata are less than or equal to the currently selected sequence number, then all changes have been flushed to disk and no other actions need to occur to make the resource metadata consistent with the resource data. If this is not the case, then the metadata may need to be fixed.

At block 735, the resource metadata is fixed as described in more detail in conjunction with FIG. 6.

At block 740, the resource metadata is rebuilt as previously described.

At block 750, the actions return.

In one embodiment, the actions of FIG. 7 may just be those actions associated with block 740. This may be done, for example, to simply implementation or because it is expected that the recovery steps described will happen so rarely that storing additional sequence numbers is not worth the performance degradation it may cause.

There are ways of increasing the number of dirty shutdowns in which recovery may occur without rebuilding the resource metadata. In one embodiment, the file system change monitor may delay its reading and processing of the journal such that it is several seconds or records behind the leading edge. The number of seconds or records may be selectable. The further the distance behind the leading edge, the more likely that any rollbacks that occur to the journal will not affect updates made by the file system change monitor. This lag between updates written to the journal and changes made to the metadata may be increased as long as the journal is sufficiently sized such that journal wrap is not likely to occur.

In another embodiment, multiple save points may be saved. As long as one of the save points has a valid entry in the journal, shutdown recovery may be performed without rebuilding the entire metadata store.

Aspects of the subject matter described herein may also be applied in other dirty shutdown scenarios not involving file replication systems where metadata that is stored in a metadata store needs to be made consistent with file system data. As in the case of file replication systems, a dirty shutdown may cause the metadata store to become inconsistent with the information in the file systems. The system may determine this kind of occurrence and take corrective action to restore the consistency of the metadata.

For example, a desktop file search application (such as Windows® Desktop Search) may read a change journal to determine which files need to be indexed, re-indexed, or removed from the index. The desktop search application may store indexes and other data regarding the files in a metadata store. If a dirty shutdown occurs, the desktop search application may need to detect whether an inconsistency has occurred and fix its metadata to make it consistent with files that are actually present on the file system after the restart from dirty shutdown. Such an application may detect inconsistencies and rebuild its metadata using aspects of the subject matter described herein.

In another example, a picture viewer (such as the one included in Microsoft® Corporation's Digital Image Suite) may maintain a database with picture metadata and thumbnails. If a dirty shutdown occurs, the picture metadata may become inconsistent with the actual data or pictures that are stored in the file system. This inconsistency could lead the picture viewer to have metadata about a file that is no longer present in the file system after a dirty shutdown; in this case, the picture's thumbnail may be incorrectly displayed. To detect that a dirty shutdown has occurred and rebuild its picture metadata and thumbnails after reboot, the picture viewer may employ aspects of the subject matter described herein.

It will be recognized that aspects of the subject matter described herein may also be applied to other shutdown scenarios.

As can be seen from the foregoing detailed description, aspects have been described related to shutdown recovery. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having stored computer-executable instructions which when executed by a computer perform a method for recovering from a dirty shutdown, the method comprising:

subsequent to a dirty shutdown of a member computer participating in a replica group, determining that a dirty shutdown has occurred on the member computer by detecting that a flag stored on the member computer is set, wherein the flag is set when a synchronization service running on the member computer begins a synchronization and the flag is cleared when the synchronization service finishes the synchronization such that the dirty shutdown is detected when the dirty shutdown occurs after the synchronization service begins and before the synchronization service finishes the synchronization, wherein the synchronization service performs the synchronization by receiving an update to a replicated file from an upstream partner of the replica group and applying the update to the replicated file stored on the member computer and updating a metadata entry corresponding to the update in a database of the member computer, wherein the metadata entry corresponding to the update includes a sequence number for the update;

upon detecting that the flag is set indicating that a dirty shutdown has occurred, determining that the synchronization service updated the metadata entry corresponding to the update but did not update the replicated file by detecting that the sequence number, included with the metadata entry is greater than a sequence number stored by a file system change monitor of the member computer, wherein the stored sequence number corresponds to a last journal entry accessed by the file system change monitor prior to the dirty shutdown such that the metadata entry indicates that the replicated file has been updated on the member computer even though the update was not applied to the replicated file;

upon detecting that the synchronization service updated the metadata entry without updating the corresponding replicated file, determining whether the sequence number stored by the file system change monitor is valid indicating that all file changes made prior to the stored sequence number have not been lost, wherein each time a change is made to a replicated file on the member computer, a journal entry is added to a journal such that the file system change monitor reads the journal entries and updates the metadata stored in the database to reflect each change, and wherein the file system change monitor stores the sequence number of the last journal entry that the file system change monitor accessed such that a loss of a file change is determined by performing the following steps:
  accessing the stored sequence number and stored timestamp that correspond to the last journal entry read by the file system change monitor prior to the dirty shutdown;
  accessing a current journal entry from the journal, the current journal entry having a sequence number that matches the stored sequence number; and
  comparing a timestamp of the current journal entry with the stored timestamp and upon determining that the timestamp of the current journal entry matches the stored timestamp, determining that no file system changes were lost; and
upon determining that the synchronization service updated metadata without updating the corresponding replicated files and upon determining that no file system changes were lost, automatically performing a shutdown recovery comprising causing resource metadata stored by the member to be consistent with resource data stored by the member by performing the following steps for each metadata entry having a sequence number greater than the stored sequence number:
  removing from a version vector of the member computer a corresponding version of the metadata entry in the version vector; and
  determining whether a replicated file corresponding to the metadata entry is stored on the member computer such that:
    upon detecting that the member computer stores a version of the replicated file, a fence value is assigned to the replicated file such that during a subsequent synchronization, the replicated file on the member computer will be updated with a version of the replicated file from an upstream partner having a higher fence value; and
    upon detecting that the member computer does not store a version of the replicated file, the metadata entry is marked for deletion.

2. The computer-readable storage medium of claim 1, wherein the dirty shutdown comprises a synchronization service dirty shutdown that occurs when a synchronization service terminates abnormally, wherein the synchronization service is arranged to synchronize resources with other members participating in the replica group.

3. The computer-readable storage medium of claim 1, wherein the dirty shutdown comprises a machine dirty shutdown that occurs when a machine hosting the member crashes or loses power while a synchronization service is executing, wherein the synchronization service is arranged to synchronize resources with other members participating in the replica group.

4. The computer-readable storage medium of claim 1, wherein the dirty shutdown comprises a volume dirty shutdown in which a volume upon which the member stores resources loses power, becomes disconnected, or is forced to dismount while a synchronization service is executing, wherein the synchronization service is arranged to synchronize resources with other members participating in the replica group.

5. The computer-readable storage medium of claim 1, wherein the replica group comprises a set of resources that are replicated on members participating in the replica group.

6. A method comprising steps executed by a processor and a memory operably coupled to the processor, wherein the memory stores program instructions executable to perform the method, for recovering from a dirty shutdown, the method comprising:
  subsequent to a dirty shutdown of a member computer participating in a replica group, determining that a dirty shutdown has occurred on the member computer by detecting that a flag stored on the member computer is set, wherein the flag is set when a synchronization service running on the member computer begins a synchronization and the flag is cleared when the synchronization service finishes the synchronization such that the dirty shutdown is detected when the dirty shutdown occurs after the synchronization service begins and before the synchronization service finishes the synchronization, wherein the synchronization service performs the synchronization by receiving an update to a replicated file from an upstream partner of the replica group and applying the update to the replicated file stored on the member computer and updating a metadata entry corresponding to the update in a database of the member computer, wherein the metadata entry corresponding to the update includes a sequence number for the update;
  upon detecting that the flag is set indicating that a dirty shutdown has occurred, determining that the synchronization service updated the metadata entry corresponding to the update but did not update the replicated file by detecting that the sequence number, included with the metadata entry is greater than a sequence number stored by a file system change monitor of the member computer, wherein the stored sequence number corresponds to a last journal entry accessed by the file system change monitor prior to the dirty shutdown such that the metadata entry indicates that the replicated file has been updated on the member computer even though the update was not applied to the replicated file;
  upon detecting that the synchronization service updated the metadata entry without updating the corresponding replicated file, determining whether the sequence number stored by the file system change monitor is valid indicating that all file changes made prior to the stored sequence number have not been lost, wherein each time a change is made to a replicated file on the member computer, a journal entry is added to a journal such that the file system change monitor reads the journal entries and updates the metadata stored in the database to reflect each change, and wherein the file system change monitor stores the sequence number of the last journal entry that the file system change monitor accessed such that a loss of a file change is determinable by performing the following steps:
    accessing the stored sequence number and stored timestamp that correspond to the last journal entry read by the file system change monitor prior to the dirty shutdown;
    accessing a current journal entry from the journal, the current journal entry having a sequence number that matches the stored sequence number; and
    comparing a timestamp of the current journal entry with the stored timestamp and upon determining that the timestamp of the current journal entry matches the stored timestamp, determining that no file system changes were lost; and
  upon determining that the synchronization service updated metadata without updating the corresponding replicated files and upon determining that no file system changes were lost, automatically performing a shutdown recovery comprising causing resource metadata stored by the member to be consistent with resource data stored by the member by performing the following steps for each metadata entry having a sequence number greater than the stored sequence number:

removing from a version vector of the member computer a corresponding version of the metadata entry in the version vector; and determining whether a replicated file corresponding to the metadata entry is stored on the member computer such that:

upon detecting that the member computer stores a version of the replicated file, a fence value is assigned to the replicated file such that during a subsequent synchronization, the replicated file on the member computer will be updated with a version of the replicated file from an upstream partner having a higher fence value; and upon detecting that the member computer does not store a version of the replicated file, the metadata entry is marked for deletion.

7. In a computing environment, an apparatus, comprising:

a journal arranged to store indications of updates to files in a file system;

a file system change monitor arranged to read the indications of updates to files in the file system and to update records of a metadata store based thereon, wherein the file system change monitor is further arranged to store a sequence number of the last journal entry that the file system change monitor has accessed to update the metadata store;

a synchronization service arranged to update the metadata store based at least in part on information other than the indications of updates stored by the journal; and a shutdown recovery component arranged to perform the following method:

subsequent to a dirty shutdown of a member computer participating in a replica group, determining that a dirty shutdown has occurred on the member computer by detecting that a flag stored on the member computer is set, wherein the flag is set when the synchronization service running on the member computer begins a synchronization and the flag is cleared when the synchronization service finishes the synchronization such that the dirty shutdown is detected when the dirty shutdown occurs after the synchronization service begins and before the synchronization service finishes the synchronization, wherein the synchronization service performs the synchronization by receiving an update to a replicated file from an upstream partner of the replica group and applying the update to the replicated file stored on the member computer and updating a metadata entry corresponding to the update in a database of the member computer, wherein the metadata entry corresponding to the update includes a sequence number for the update;

upon detecting that the flag is set indicating that a dirty shutdown has occurred, determining that the synchronization service updated the metadata entry corresponding to the update but did not update the replicated file by detecting that the sequence number included with the metadata entry is greater than the sequence number stored by the file system change monitor, such that the metadata entry indicates that the replicated file has been updated in the file system even though the update was not applied to the replicated file;

upon detecting that the synchronization service updated the metadata entry without updating the corresponding replicated file, determining whether the sequence number stored by the file system change monitor is valid indicating that all file changes made prior to the stored sequence number have not been lost wherein a loss of a file change is determinable by performing the following steps:

accessing the stored sequence number and stored timestamp that correspond to the last journal entry read by the file system change monitor prior to the dirty shutdown;

accessing a current journal entry from the journal, the current journal entry having a sequence number that matches the stored sequence number; and comparing a timestamp of the current journal entry with the stored timestamp and upon determining that the timestamp of the current journal entry matches the stored timestamp, determining that no file system changes were lost; and upon determining that the synchronization service updated metadata without updating the corresponding replicated files and upon determining that no file system changes were lost, automatically performing a shutdown recovery comprising causing resource metadata stored by the member to be consistent with resource data stored by the member by performing the following steps for each metadata entry having a sequence number greater than the stored sequence number:

removing from a version vector of the member computer a corresponding version of the metadata entry in the version vector; and determining whether a replicated file corresponding to the metadata entry is stored on the member computer such that:

upon detecting that the member computer stores a version of the replicated file, a fence value is assigned to the replicated file such that during a subsequent synchronization, the replicated file on the member computer will be updated with a version of the replicated file from an upstream partner having a higher fence value; and upon detecting that the member computer does not store a version of the replicated file, the metadata entry is marked for deletion.

8. The apparatus of claim 7, wherein the synchronization service is arranged to communicate with other members participating in the replica group and to update the files in the file system and the metadata store based on updates received from the other members.

* * * * *